(12) United States Patent
Werner et al.

(10) Patent No.: US 10,791,907 B2
(45) Date of Patent: Oct. 6, 2020

(54) TIP HOLDER

(71) Applicant: WILTON INDUSTRIES, INC., Naperville, IL (US)

(72) Inventors: Michael Werner, Naperville, IL (US); Traci Chapple, Naperville, IL (US); Shannon Smith, Naperville, IL (US)

(*) Notice: Subject to any disclaimer, the term of this patent is extended or adjusted under 35 U.S.C. 154(b) by 0 days.

(21) Appl. No.: 15/981,582

(22) Filed: May 16, 2018

(65) Prior Publication Data

US 2019/0350435 A1 Nov. 21, 2019

(51) Int. Cl.
*A47L 15/50* (2006.01)
*A23G 3/28* (2006.01)

(52) U.S. Cl.
CPC ............. *A47L 15/505* (2013.01); *A23G 3/28* (2013.01)

(58) Field of Classification Search
None
See application file for complete search history.

(56) References Cited

U.S. PATENT DOCUMENTS 3,878,992 A * 4/1975 MacManus ............. A23G 3/28
239/553
2013/0287910 A1* 10/2013 Grimes .................... A23G 3/28
426/249

* cited by examiner

*Primary Examiner* — Eric W Golightly
(74) *Attorney, Agent, or Firm* — Foley & Lardner LLP

(57) ABSTRACT

A decorating tip holder includes a main body and a base configured to engage and to disengage with the main body. The main body includes at least one aperture in a side surface thereof, and at least one flange proximate to the at least one aperture. The main body is configured to receive and secure at least one decorating tip. The at least one aperture is configured to secure a decorating tip base of the at least one decorating tip, and the at least one flange is configured to secure a tip of the at least one decorating tip.

21 Claims, 4 Drawing Sheets

TIP HOLDER

BACKGROUND

The present application relates to apparatuses for holding and/or storing decorating tips. Specifically, the present application relates to a dishwasher safe holder for holding and/or storing decorating tips of various sizes.

Baked good decorators often utilize featherweight or disposable bags in the decorating process. The decorator fills the bag with a desired filling or icing and squeezes the filling or icing out of a decorating tip located at the end of the bag. Often times, multiple decorating tips are used in one decorating session. Due to the shape and size of the decorating tip, and the sticky or greasy nature of the contents of the disposable bags (e.g., icing, filling or frosting), it is often a hassle to clean the decorating tip after use. The decorator must wash each tip by hand, or use an improvised container that prevents the tip from being displaced during a wash cycle of a dishwasher. Issues encountered when using a dishwasher to clean the decorating tips include the decorating tips falling through apertures in the dishwashing tray and ending up in the dishwasher drain or a pool of dishwater, or the decorating tips bouncing/rolling around in the dishwasher upon being contacted by the water stream, thereby preventing adequate cleaning.

A need exists for improved technology, including technology that may address the above described problems.

SUMMARY

In one embodiment, a decorating tip holder includes a main body and a base configured to engage and to disengage with the main body. The main body includes at least one aperture in a side surface thereof, and at least one flange proximate to the at least one aperture. The main body is configured to receive and secure at least one decorating tip. The at least one aperture is configured to secure a decorating tip base of the at least one decorating tip, and the at least one flange is configured to secure a tip of the at least one decorating tip.

In another embodiment, a decorating tip holder system includes at least one decorating tip having a tip and a base at an opposite end thereof, a main body, and a base configured to engage and to disengage with the main body. The main body includes at least one aperture in a side surface thereof, and at least one flange proximate to the at least one aperture. The main body is configured to receive and secure the at least one decorating tip. The at least one aperture is configured to secure a decorating tip base of the at least one decorating tip, and the at least one flange is configured to secure a tip of the at least one decorating tip.

In one aspect of either of these embodiments, the decorating tip holder further includes at least one main body aperture in an upper surface of the main body, and at least one base aperture in the base configured to be aligned with the at least one main body aperture when the main body is engaged with the base. The main body is configured to receive and secure at least one additional decorating tip in an interior thereof. The base is configured to secure a decorating tip base of the at least one additional decorating tip, and the at least one main body aperture is configured to secure a tip of the at least one additional decorating tip. In the embodiment directed to the decorating tip system, the at least one additional decorating tip is an additional element of the system.

In one aspect of either of these embodiments, the base includes at least one retaining member configured to secure the decorating tip base of the at least one decorating tip.

In one aspect of either of these embodiments, the at least one flange comprises a flange aperture having gripping elements extending towards a center thereof. The gripping elements are configured to flex upwards upon receipt of the at least one decorating tip within the flange aperture.

In one aspect of either of these embodiments, the at least one main body aperture includes gripping elements extending towards a center thereof. The gripping elements are configured to flex upwards upon receipt of the at least one additional decorating tip within the main body aperture.

In one aspect of either of these embodiments, the base is a disc including at least one cut-out arranged at an outer perimeter thereof. The at least one cut-out is configured to be aligned with the at least one aperture when the main body and the base are engaged.

In one aspect of either of these embodiments, the main body and the base are configured to engage via friction fit, threading, bayonet mounting, snap-fit mounting, or latches.

In one aspect of either of these embodiments, the main body has a frustoconical shape.

In one aspect of either of these embodiments, the dishwasher safe material comprises an elastomer (e.g., silicone or rubber).

In one aspect of either of these embodiments, the at least one additional decorating tip is a different size than the at least one decorating tip.

In one aspect of either of these embodiments including a plurality of decorating tips, at least one of the plurality of decorating tips is a different size than another one of the plurality of decorating tips.

A method of using the decorating tip holder or the decorating tip holder system in a dishwasher includes securing the decorating tip base of the at least one decorating tip in the at least one aperture of the main body, and the tip of the at least one decorating tip in the at least one flange; engaging the main body and the base; inserting the decorating tip holder into a dishwasher; and starting a dishwashing cycle. The at least one decorating tip is secured in the main body in a position that allows water in the dishwasher to flow between the tip and the base of the at least one decorating.

Alternatively, a method of using the decorating tip holder or the decorating tip holder system in a dishwasher includes securing the decorating tip base of the at least one decorating tip in the at least one aperture of the main body, and the tip of the at least one decorating tip in the at least one flange; securing the decorating tip base of the at least one decorating tip to the base, and the tip of the at least one additional decorating tip in the at least one main body aperture; engaging the main body and the base; inserting the decorating tip holder into a dishwasher; and starting a dishwashing cycle. The at least one decorating tip is secured in the main body in a position that allows water in the dishwasher to flow between the tip and the decorating tip base of the at least one decorating tip. The at least one additional decorating tip is secured in the main body in a position that allows water in the dishwasher to flow between the tip and the decorating tip base of the at least one additional decorating tip via the base aperture.

One of ordinary skill in the art would understand that these aspects are not mutually exclusive. Any two or more of these aspects may be combined.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

DETAILED DESCRIPTION

Figure 1:
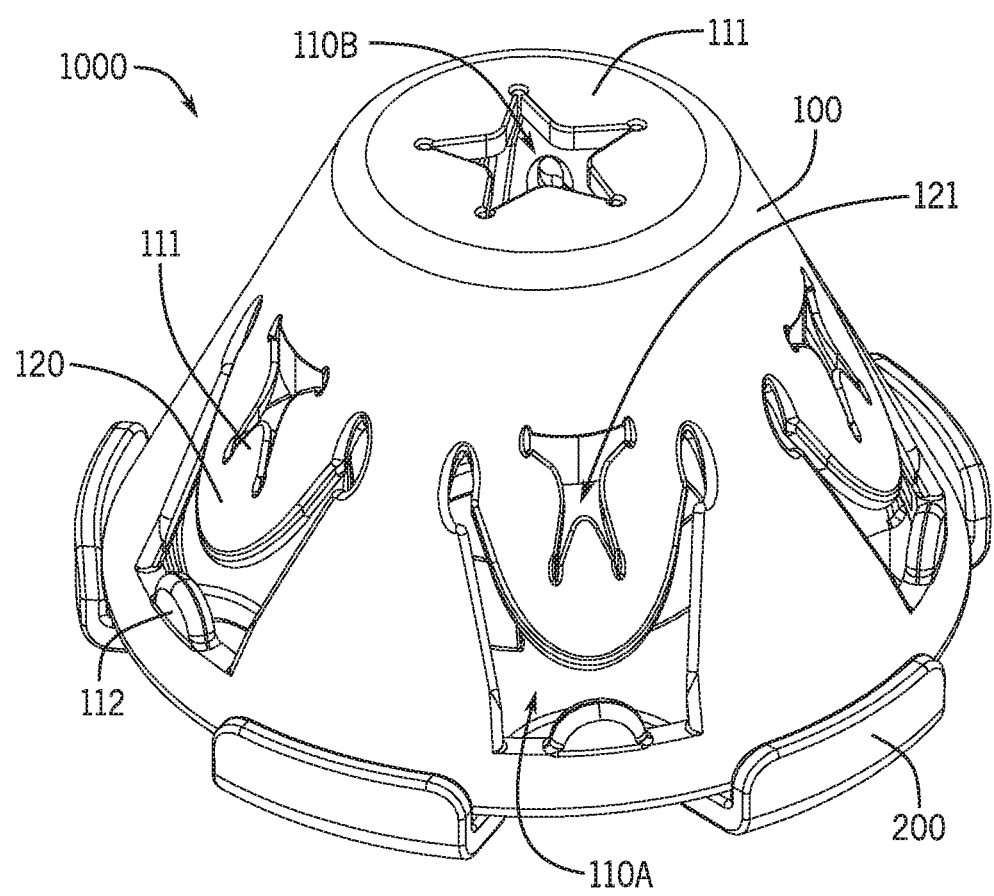
FIG. 1 illustrates an exemplary embodiment of a tip holder including a main body engaged with a base.
Figure 2:
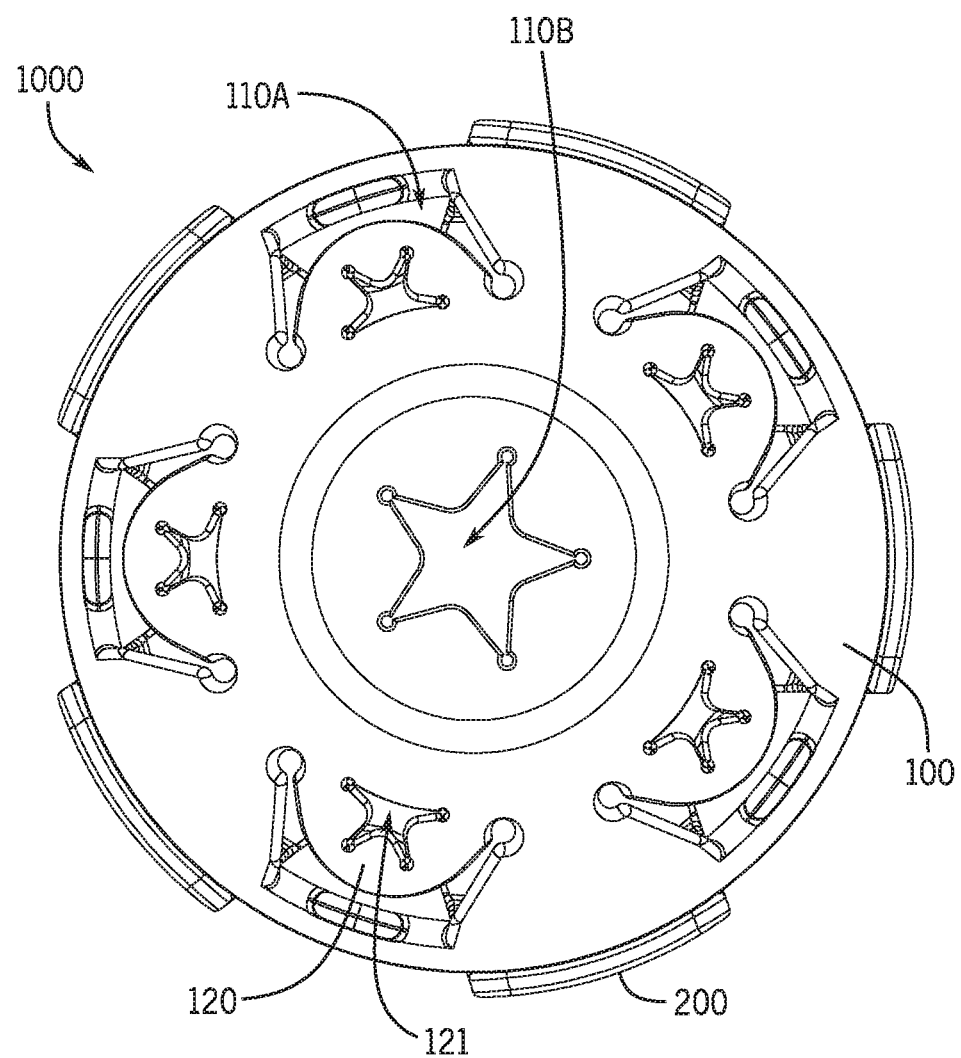
FIG. 2 is a top view of the tip holder of FIG. 1.
Figure 3:
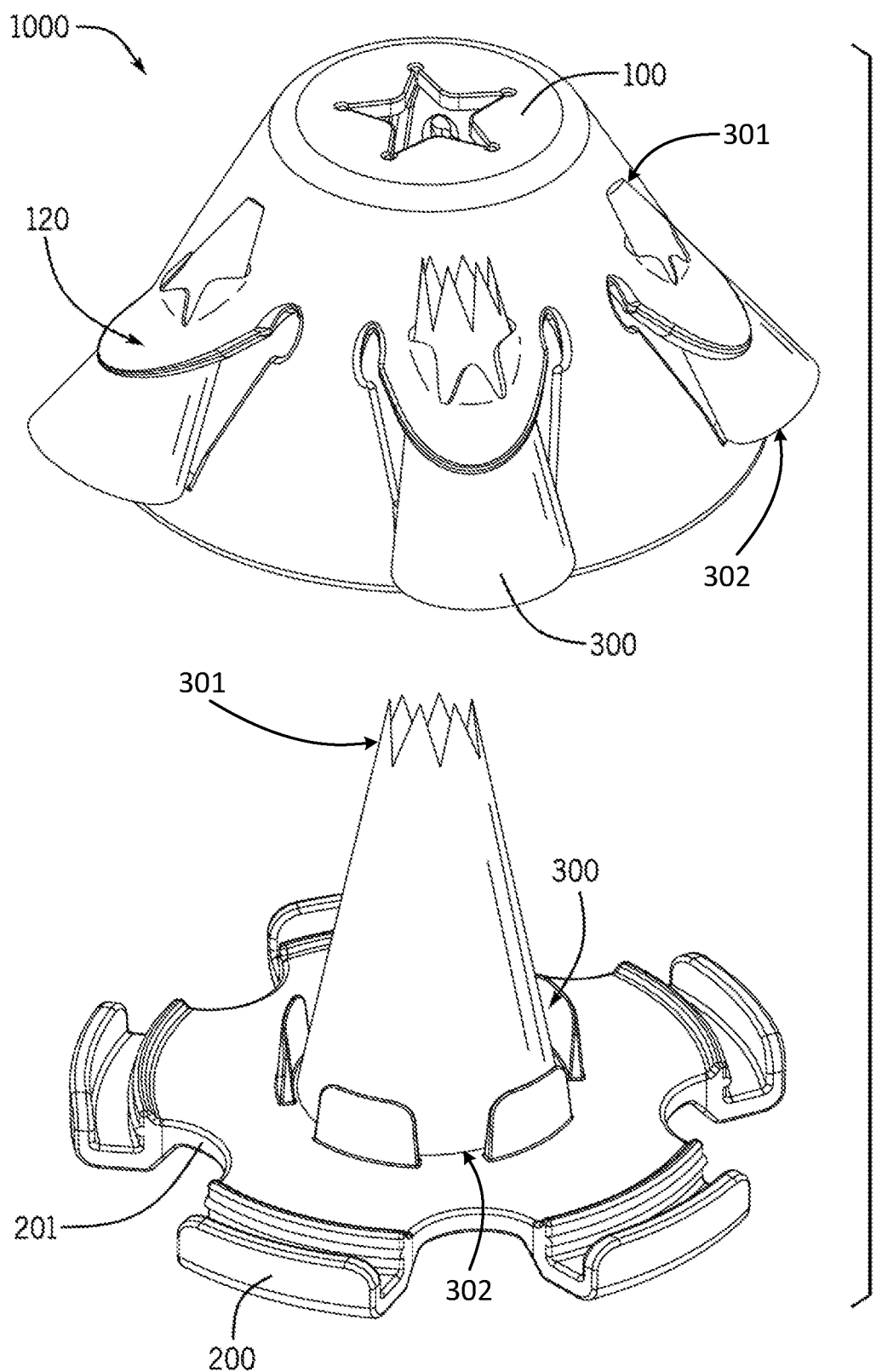
FIG. 3 illustrates an exemplary embodiment of a tip holder including a plurality of decorating tips and the tip holder of FIG. 1, where the main body and the base are disengaged.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As illustrated in FIGS. 1-4, a tip holder 1000 includes a main body 100 and a base 200. The main body 100 is configured to repeatedly and reversibly engage and disengage with the base 200. Engagement between the main body 100 and the base 200 may be accomplished by friction fit, threading, bayonet mounting, snap-fit mounting, latches or any other engagement mechanism. The main body 100 is configured to receive at least one decorating tip 300. The decorating tip 300 may be a standard size decorating tip, a smaller than standard size decorating tip, or a larger than standard size decorating tip. In some examples, the main body 100 is configured to receive a plurality of decorating tips 300. In such examples, the decorating tips 300 may all be the same, or at least one decorating tip 300 may differ from the other decorating tips 300 in terms of size or type of decorating tip (e.g., round tip, leaf tip, drop flower tip, petal tip, ruffle tip, basketweave tip, rose tip, star tip, leaf tip, multi-opening tip, cake icer tip, grass tip, or any other specialty tip). The details of the main body 100 and the base 200 are described below in further detail.

Main Body

The main body 100 is made of a dishwasher safe material. For example, the main body 100 may be made of an elastomer such as silicone or rubber, or a plastic. The main body 100 includes at least one aperture 110A or 110B configured to receive a decorating tip 300. Preferably, the main body 100 includes a plurality of apertures 110A and/or 110B, where each aperture 110A, 110B is configured to receive one decorating tip 300. The apertures 110A are provided at side surfaces of the main body 110 around a perimeter thereof, while the apertures 110B are provided at an upper surface of the main body 110. In some examples, the main body 100 only includes one or more apertures 110A (i.e., no apertures 110B). In other examples, the main body 100 only includes one or more apertures 110B (i.e., no apertures 110A). In further examples, the main body 100 includes at least one aperture 110A and at least one aperture 110B (e.g., a plurality of apertures 110A and only one aperture 110B; a plurality of apertures 110B and only one aperture 110A; or a plurality of apertures 110A and a plurality of aperture 110B). When a plurality of apertures 110A are provided, the apertures 110A may be equidistant from one another. The apertures 110A may be provided in a symmetrical or an asymmetrical relationship with respect to a center of the main body 110. Similarly, when a plurality of apertures 110B are provided, the apertures 110B may be equidistant from one another. The apertures 110B may be provided in a symmetrical or an asymmetrical relationship with respect to a center of the main body 110. The apertures 110A, 110B may be any suitable shape.

The main body 100 further includes at least one flange 120 having a flange aperture 121 therein. The flange aperture 121 is configured to receive a top 301 of the decorating tip 300 therein to secure the decorating tip 300 to the main body 100. Preferably, the main body 100 includes a plurality of flanges 120, where each flange 120 is configured to receive one decorating tip 300 in the flange aperture 121 thereof. Each flange 120 is aligned with a corresponding aperture 110A provided at a side surface of the main body 110 (i.e., a number of flanges 120 is equal to a number of apertures 110A). In some examples, the flange 120 may be a protrusion that always extends from a side surface of the main body 100. In other examples, the flange 120 may be configured to flex in any number of positions between a first position extending into an interior of the main body 100, a second position within a plane of the side surface of the main body 100, and a third position extending outwards from a side surface of the main body 100.

As illustrated in the figures, when the decorating tip 300 is provided at a side surface of the main body 100, the top 301 or upper portion of the decorating tip 300 is configured to be secured by the flange 120, while a bottom 302 of the decorating tip 300 is configured to be received in and secured by the aperture 110A. In some examples, the aperture 110A may include a retaining member 112 (e.g., a tab) configured to be received in the bottom 302. Both the flange 120 and the aperture 110A prevent the decorating tip 300 from falling out of the main body 100. When the tip holder 1000 is inserted in a dishwasher, water from the dishwasher is configured to flow from the bottom 302 to the top 301 (and vice versa) to rinse the decorating tip 300 and clean any debris or residue from the contents of the decorating bag. As illustrated in the figures, the apertures 110A are provided in a single row. However, the concepts disclosed in the present application are not necessarily limited in this regard. In other examples, the main body 100 may be larger and include a plurality of rows of apertures 110A such that the tip holder 1000 is capable of holding more decorating tips 300.

In one example, as illustrated in the figures, the main body 100 is hollow and has a frustoconical shape (i.e., having the shape of a cone with the tip removed). However, the concepts disclosed in the present application are not necessarily limited in this regard. In other examples, the main body 100 may be any suitable shape, provided that any decorating tip 300 received therein is exposed to an unobstructed flow of water in the dishwasher. In examples in which the main body 100 has a frustoconical shape, a slope of the side surfaces of the main body is approximately the same as a slope of the side surfaces of the decorating tip 300. Thus, when the decorating tip 300 is received within the aperture 110A and the flange 120, the decorating tip 300 is provided at an angle with respect to the base. Moreover, a portion of the decorating tip 300 may substantially flush against a portion of the side surface of the main body 100.

The main body 100 may further include an aperture 110B (i.e., a main body aperture) provided at an upper surface thereof. However, the concepts disclosed in the present application are not necessarily limited in this regard. In other examples, the main body 100 may include a plurality of apertures 110B provided at the upper surface thereof. When the main body 100 is engaged with the base 200, the top 301 of an additional decorating tip 300 is configured to be received in the aperture 110B provided at the upper surface of the main body 100, while the bottom 302 of the decorating tip 300 is secured in the base 200 (described in further detail below). In other words, the additional decorating tip 300 is provided within the main body 100 of the tip holder 1000 with the top 301 thereof extending from the main body 100 via the aperture 110B provided at the upper surface of the main body 100. In some examples, the apertures 110A and the aperture(s) 110B are configured to receive any of a standard size decorating tip, a smaller than standard size decorating tip, or a larger than standard size decorating tip. However, in some examples, the apertures 110A are configured to receive a standard size decorating tip or a smaller than standard size decorating tip, while the aperture 110B is configured to receive a larger than standard size decorating tip. A standard size tip can be used with a standard coupler. An example of a standard size decorating tip is Wilton's No. 67 tip. An example of a larger than standard size decorating tip is Wilton's No. 1M tip.

The apertures 121, 110B may include one or more gripping elements 111 that extend towards a center thereof. When a decorating tip 300, in particular, the top 301 of the decorating tip 300, is received within the flange aperture 121, 110B, the gripping elements 111 are displaced upwards (when the top 301 is inserted from a bottom surface of the flange 120) and assist in maintaining the friction fit between the decorating tip 300 and the main body 110. The gripping elements 111 provide flexibility to the apertures 121, 110B to allow for the insertion of different sizes and geometries of decorating tips 300. The gripping elements 111 provide the optimal stiffness to secure the decorating tip 300 in that the gripping elements 111 are configured to flex in and out to receive a range of different sized or shaped tips. For example, when a larger than standard size decorating tip 300 is used, the gripping elements 111 flex outward.

Base

Figure 4:
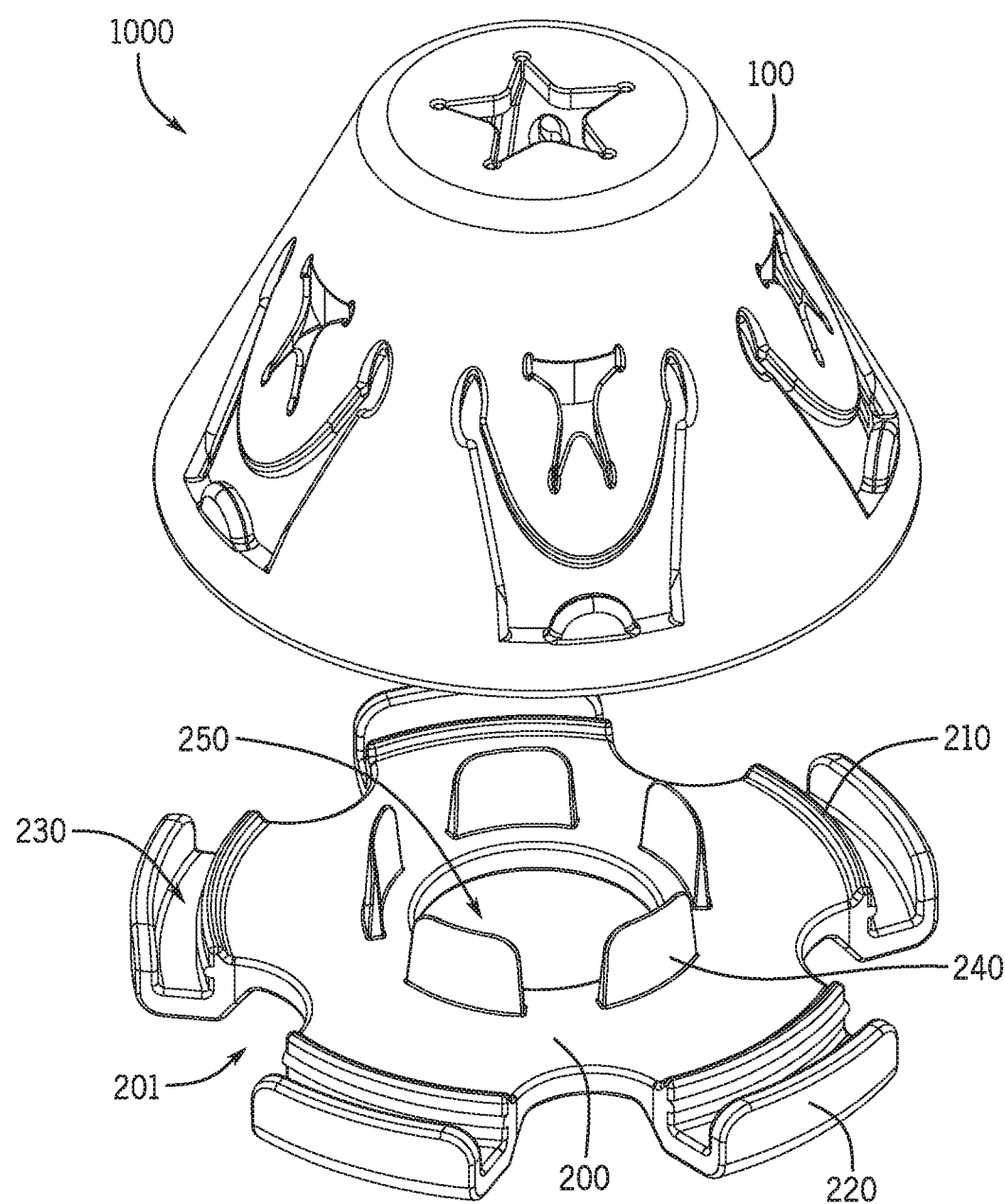
FIG. 4 illustrates the tip holder of FIG. 1 where the main body and the base are disengaged.

The base 200 is made of a dishwasher safe material. For example, the base 200 may be made of an elastomer such as silicone or rubber, or a plastic. The base 200 is rigid relative to the main body 100. A shape of the base 200 corresponds to a shape of a base of the main body 100. For example, when the main body 100 is frustoconical, the base 200 is circular. Referring to FIG. 4, in some examples, the base 200 is a circular disc having cut-outs 201 (i.e., portions of the disc that have been removed) configured to be aligned with the apertures 110a when the main body 100 and the base 200 are engaged. The cut-outs 201 assist with water flow through the decorating tip 300 during dishwasher use, as the portions of the disc that were removed to form the cut-outs 201 would have otherwise obstructed the water flow. The base 200 includes an inner ring 210 and an outer ring 220 concentric with the inner ring 210. A channel 230 is formed between the inner ring 210 and the outer ring 220. The channel 230 is configured to receive and secure a portion of the main body 100, when the main body 100 and the base 200 are engaged. In some examples, the base of the main body 100 and the channel 230 may be threaded to facilitate engagement between the main body 100 and the base 200. In other examples, the outer ring 220 may be replaced with latches to facilitate engagement between the main body 100 and the base 200.

An interior portion of the inner ring 210 may include one or more retaining member 240 configured to receive the bottom 302 of the decorating tip 300 therein. The retaining members 240 may or may not contact the bottom 302 of the decorating tip 300 (i.e., there may be a gap between the retaining members 240 and the bottom 302). The retaining members 240 are configured to prevent the bottom 302 of the decorating tip 300 from sliding along a surface of the base 200 during dishwasher use. The retaining members 240 are rigid. A portion of the base 200 bounded by the retaining members 240 may be removed to form an aperture 250. In dishwasher use, the bottom 302 of the decorating tip 300 is configured to be aligned with the aperture 250 to allow water to flow through the decorating tip 300 provided within the tip holder 1000. When a plurality of apertures 110B are provided in the upper surface of the main body 100, a plurality of apertures 250 will also be provided (i.e., one aperture 250 for each aperture 110B).

The tip holder described herein is dishwasher safe and configured to hold decorating tips in place for easy cleaning in a dishwasher. The tip holder is configured to hold a plurality of decorating tips of various sizes and shapes, including decorating tips that are larger than the standard size. The decorating tips are arranged at an outer circumference of the tip holder or within the tip holder to allow water to flow from a base to a tip of the decorating tip (and vice versa). The plurality of apertures within the tip holder help secure the decorating tip, facilitate water flow, and/or facilitate water draining from the tip holder such that dirty water does not accumulate within the tip holder. When not used in a dishwasher, the tip holder may be used as a storage case to organize decorating tips. For example, after drying, the tip holder may be removed from the dishwasher and placed directly in a storage cabinet or drawer, as is. Alternatively, the tip holder may be used to retain decorating tips that are not currently being used, but will be used at a later time or were used at an earlier time in the decorating session.

The construction and arrangements of the tip holder, as shown in the various exemplary embodiments, are illustrative only. Although only a few embodiments have been described in detail in this disclosure, many modifications and combinations are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A decorating tip holder comprising:
   a main body including:
      a sloped side-wall cooperating with an upper surface to define a cavity;
      a first aperture in the sloped side-wall, and
      a first flange proximate to and extending into the first aperture from one side, the first flange having a first flange aperture; and
   a base configured to engage and to disengage with the main body,
   wherein the main body is configured to receive and secure a decorating tip within the first aperture and within the first flange aperture, and
   wherein the first aperture is configured to secure a bottom portion of the decorating tip and the first flange aperture is configured to secure a top portion of the decorating tip.

2. The decorating tip holder of claim 1, wherein the main body comprises:
   a plurality of apertures in the sloped side-wall, the plurality of apertures being arranged along a perimeter of the main body; and
   a plurality of flanges,
   wherein a number of flanges corresponds to a number of apertures in the sloped side-wall.

3. The decorating tip holder of claim 1, further comprising:
   a second aperture in the upper surface of the main body; and
   a third aperture in the base, the third aperture configured to be aligned with the second aperture when the main body is engaged with the base.

4. The decorating tip holder of claim 3, wherein the base includes a retaining member proximate to the third aperture and configured to secure the decorating tip.

5. The decorating tip holder of claim 3, wherein the second aperture includes gripping elements extending towards a center thereof, the gripping elements configured to flex upwards upon receipt of an additional decorating tip.

6. The decorating tip holder of claim 1, wherein the first flange comprises a flange aperture having gripping elements extending towards a center thereof, the gripping elements configured to flex upwards upon receipt of the decorating tip within the flange aperture.

7. The decorating tip holder of claim 1, wherein the base defines a disc, the base comprising a cut-out arranged at an outer perimeter thereof, the cut-out configured to be aligned with the first aperture when the main body and the base are engaged.

8. The decorating tip holder of claim 1, wherein the main body and the base are configured to engage via friction fit, threading, bayonet mounting, snap-fit mounting, or latches.

9. The decorating tip holder of claim 1, wherein the main body has a frustoconical shape.

10. The decorating tip holder of claim 1, wherein the main body comprises an elastomer.

11. A method of using the decorating tip holder of claim 1 in a dishwasher, the method comprising:
   securing the decorating tip in the first aperture and in the first flange;
   engaging the main body and the base;
   inserting the decorating tip holder into a dishwasher; and
   starting a dishwashing cycle,
   wherein the main body secures the decorating tip in a position that allows water in the dishwasher to flow through the decorating tip.

12. A method of using the decorating tip holder of claim 3 in a dishwasher, the method comprising:
   securing the decorating tip in the first aperture and the first flange;
   securing an additional decorating tip to the base, and extending the additional decorating tip through the second aperture;
   engaging the main body and the base;
   inserting the decorating tip holder into a dishwasher; and
   starting a dishwashing cycle,
   wherein the main body secures the decorating tip in a position that allows water in the dishwasher to flow through the decorating tip, and
   wherein the main body secures the additional decorating tip in a position that allows water in the dishwasher to flow into the additional decorating tip via the third aperture.

13. A decorating tip holder system comprising:
   a decorating tip having a top and a bottom at an opposite end thereof; and
   a decorating tip holder, the decorating tip holder comprising:
      a main body including:
         a first aperture in a side surface thereof, and
         a first flange proximate to and extending into the first aperture; and
      a base configured to engage and to disengage with the main body,
      wherein the first aperture is configured to receive and secure the decorating tip, and wherein the bottom is configured to be secured in the first aperture, and the top is configured to be secured by the first flange.

14. The decorating tip holder system of claim 13, further comprising:
an additional decorating tip having an additional top and an additional bottom at an opposite end thereof,
wherein the decorating tip holder further comprises:
a second aperture in an upper surface of the main body; and
a third aperture in the base configured to be aligned with the second aperture when the main body is engaged with the base,
wherein the main body is configured to receive and secure the additional decorating tip in an interior thereof, and
wherein the additional bottom is secured by the base, and the additional top is secured in the second aperture.

15. The decorating tip holder system of claim 14, wherein the additional decorating tip is a different size than the decorating tip.

16. The decorating tip holder system of claim 13,
wherein the decorating tip holder system comprises a plurality of decorating tips,
wherein the main body comprises:
a plurality of apertures in the side surface thereof, the plurality of apertures being arranged along a perimeter of the main body; and
a plurality of flanges, and
wherein one of the plurality of decorating tips is configured to be secured in one aperture and one flange.

17. The decorating tip holder system of claim 16, wherein at least one of the plurality of decorating tips is a different size than another one of the plurality of decorating tips.

18. A decorating tip holder comprising:
a main body including:
at least one side aperture in a side surface thereof;
at least one flange proximate to the at least one side aperture; and
at least one main body aperture in an upper surface of the main body; and
a base configured to engage and to disengage with the main body, the base comprising at least one base aperture in the base configured to be aligned with the at least one main body aperture when the main body is engaged with the base,
wherein the main body is configured to receive and secure a first decorating tip;
wherein the at least one side aperture is configured to secure a first base of the first decorating tip, and the at least one flange is configured to secure a first tip of the first decorating tip;
wherein the main body is configured to receive and secure a second decorating tip in an interior thereof; and
wherein the base is configured to secure a second base of the second decorating tip, and the at least one main body aperture is configured to secure a second tip of the second decorating tip.

19. The decorating tip holder of claim 18, wherein the base includes at least one retaining member, the at least one retaining member configured to secure the second base of the second decorating tip.

20. The decorating tip holder of claim 18, wherein the at least one main body aperture includes gripping elements extending towards a center thereof, the gripping elements configured to flex upwards upon receipt of the second decorating tip within the at least one main body aperture.

21. A method of using the decorating tip holder of claim 18 in a dishwasher, the method comprising:
securing the first base of the first decorating tip in the at least one side aperture of the main body, and the first tip of the first decorating tip in the at least one flange;
securing the second base of the second decorating tip on the base, and the second tip of the second decorating tip in the at least one main body aperture;
engaging the main body and the base;
inserting the decorating tip holder into a dishwasher; and
starting a dishwashing cycle,
wherein the main body secures the first decorating tip in a position that allows water in the dishwasher to flow between the first tip and the first base of the first decorating tip, and
wherein the main body secures the second decorating tip in a position that allows water in the dishwasher to flow between the second tip and the second base of the second decorating tip via the at least one base aperture.

* * * * *